Patented Sept. 24, 1946

2,408,259

UNITED STATES PATENT OFFICE 2,408,259

VAT DYESTUFFS AND PROCESS OF MAKING SAME

Theodor Holbro, Basel, Walter Kern, Sissach, and Paul Sutter, Basel, Switzerland, assignors to Society of Chemical Industry in Basle, Basel, Switzerland No Drawing. Application February 4, 1943, Serial No. 474,728. In Switzerland January 8, 1942

13 Claims. (Cl. 260—303)

The present invention is concerned with new vat dyestuffs and a process for producing the same. More particularly the invention is concerned with vat dyestuffs of the anthraquinone series and still more particularly with those containing carbonamide groupings and/or heterocyclic groupings derivable therefrom.

A considerable number of vat dyestuffs containing carbonamide groupings is already known. Amongst this group of vat dyestuffs, generally speaking, those are of special interest which dye yellow tints because yellow and more particularly bright yellow to greenish yellow tints are not easily obtainable with vat dyestuffs of other groups. However it is generally known that many yellow to greenish yellow vat dyestuffs are defective in fastness to light and/or affinity to cellulosic fiber and therefore there is still a strong demand for better dyestuffs.

According to the present invention new and valuable vat dyestuffs are prepared by reacting carboxylic acids of anthraquinone derivatives, containing at least two rings, at least one of which is heterocyclic, linked to at least two peri-positions of the anthraquinone nucleus, with amines of vattable compounds.

The starting compounds required for the present process viz. anthraquinone compounds with heterocyclic rings linked to peri-positions may be prepared from such anthraquinone substitution products containing substituents in at least two alpha-positions which promote ring formation, e. g. halogen, amino, hydroxyl nitro, or carboxylic groups. Besides those substituents required for ring formation the said anthraquinone substitution products may contain further substituents preferably of such nature and/or in such positions that they do not interfere with the intended formation of rings. Amongst such additional substituents carboxylic groups and/or substituents or groupings capable of being transformed into or of being replaced by carboxylic groups or functional derivatives thereof are to be mentioned. As there are four combinations of peri-positions in the anthraquinone nucleus (1:9, 8:9, 4:10, 5:10) to which rings can be linked, the substituents intended for ring formation can be in any two or more than two of the four alpha-positions, for example in 1 and 4 or preferably in 1 and 5 (or 4 and 8 respectively) position whereas it is preferable, but not necessary, that additional substitution occupy beta-positions, for example 2 and 7 or preferably 2 and 6 position if two additional substituents are present, or only one of these positions or even more.

For the preparation of the present starting compounds at least two rings (one at least being heterocyclic) are linked to at least two peri-positions whereby preferably both the 9- and the 10-position of the anthraquinone nucleus are involved in ring formation. The reaction may be carried out symmetrically in 1:9 and 5:10 or in 1:9 and 4:10 positions, or according to the circumstances first one ring and afterwards a second ring may be closed, whereby asymmetrical anthraquinone derivatives may be obtained.

Amongst heterocyclic rings which may be fused on according to methods known per se there are six-membered rings such as pyridine, pyridone, pyridazine, pyrimidine and pyrimidone rings which may carry substituents such as alkyl groups, especially lower alkyl groups containing up to five carbon atoms or carboxylic groups. In some cases five-membered rings are of especially favorable character such as thiazole and pyrazole rings which may also carry substituents as mentioned above. By way of example 1:5-dichloranthraquinone-2:6-dicarboxylic acid can be transformed by direct reaction with alkali polysulfides such as sodium disulfide and ammonia into 1:9,5:10-anthradithiazol-2,6-dicarboxylic acid, or the same product may be condensed with alkyl-hydrazines, such as methyl-hydrazine to 1:9,5:10-di-(N)-methyl-pyrazolanthrone. For the preparation of other anthraquinone derivatives containing heterocyclic rings other methods and conditions are necessary, which are known per se and only their application is to be adapted to the special case.

If these anthraquinone derivatives containing heterocyclic rings do not yet possess the desired carboxylic groups or functional derivatives thereof, such groups may be introduced into the molecule in a separate step, for example by exchange or transformation of substituents already present or purposely introduced, for or into carboxylic groups.

As already mentioned new vat dyestuffs are made from these anthraquinone derivatives containing as substituents one, preferably two, or more carboxylic groups and having fused on at least two rings in peri-positions, which rings may be of the same or of different kind and at least one of the said rings being heterocyclic and therefore containing one or more hetero-atoms, for example nitrogen, sulfur and oxygen alone or in combination. The carboxylic groups may be situated in the anthraquinone nucleus or in a hetero ring. Some especially valuable dyestuffs are obtained from anthradithiazole carboxylic acids, such as 1:9,5:10-anthradithiazole-2:6-(or 4:8)-dicarboxylic acid or from the corresponding mono-carboxylic acids, containing only one carboxylic group, for example in 2-position.

The new vat dyestuffs are made by reacting the said carboxylic acids with vattable compounds containing amino groups. Vattable compounds suitable for this purpose are those for example which belong to the anthraquinone series. They may be aminoanthraquinones or may contain condensed ring systems containing more than three six-membered carbon rings, such as aminodibenzanthrones and aminopyranthrones, or such as are obtained by condensing heterocyclic rings with an anthraquinone nucleus, as aminoanthrapyrimidines or aminoanthraquinonebenzacridones. Amongst the aminoanthraquinones 1-aminoanthraquinone and 2-aminoanthraquinone may be mentioned and especially aminoanthraquinones containing further substituents such as alkoxy (methoxy) or acylamino groups, wherein the acyl residue may be derived from an aliphatic (e. g. acetic) aromatic (e. g. benzoic and substituted benzoic) or heterocyclic (e. g. pyridinecarboxylic) acid, and halogen atoms such as chlorine or bromine.

This list of compounds is not limitative but only illustrates the invention. Further vattable amino-compounds not belonging to the anthraquinone series may be used, such as amino-substitution products of indigo, thioindigo, pyrenequinone, dibenzpyrenequinone as well as similar compounds. There too substituents as are permissible in vat dyestuffs may be present.

In several instances such vattable compounds may be used which, for instance in ortho-position to an amino group, contain at least one substituent which gives rise to formation of a heterocyclic ring. Such substituents are for instance the hydroxyl-, mercapto-, nitro- or aminogroups as well as halogen atoms. According to the particular conditions oxazole-, thiazole- and imidazol-rings may be formed immediately following the reaction with the carboxylic acids or their functional derivatives, or these rings may be formed in a separate step, according to generally known methods.

For carrying out the reaction with vattable compounds containing amino groups, the carboxylic acids mentioned above are used preferably in form of their functional derivatives, capable of reaction, i. e. as acid halides or acid amides. The reaction may be carried out in indifferent dispersing or dissolving agents, particularly those having a high boiling point, such as chlorobenzene, dichlorobenzenes, or nitrobenzene, at elevated temperatures for instance at the boiling point of such indifferent solvents. In certain instances room temperature or a slightly raised temperature may be more suitable. According to known methods agents capable of binding acid, agents capable of eliminating ammonia or catalytically active agents may be used. The addition of tertiary bases such as pyridine to the reaction medium has proved to be of particular advantage in many instances. If dichlorides of dicarboxylic acids are used the proportions of the reagents are preferably so chosen that all the carboxylic acid groups enter into reaction.

The products of the present invention may also be obtained in a somewhat different way by reacting the corresponding carboxylic acid amides with vattable compounds containing an exchangeable halogen atom.

The products of the present invention are vat dyestuffs and may be used accordingly for dyeing and printing the most diverse fibers of animal or vegetable origin, such as wool, silk and leather, but especially cotton, hemp, rayon and staple fibers from regenerated cellulose as well as mixtures of the aforementioned fibers. They may further be converted according to known methods into leuco sulfuric acid esters.

The present invention provides inter alia yellow dyestuffs of very pure shade possessing very good all-around fastness and especially excellent fastness to light.

It is interesting to note that practically all carboxylic acids hitherto used for preparing vat dyestuffs of the carbonamide type if combined with 2-aminoanthraquinone yield dyestuffs of such inferior strength and affinity for cellulosic fibers, that these dyestuffs are devoid of any value. In contradistinction to this the present dyestuffs in which 2-amino-anthraquinone is present as component show good affinity and strength. As compared with the corresponding dyestuffs made from 1:5-anthraquinonedicarboxylic acids and vattable amines the dyestuffs of the present invention are quite generally distinguished by much improved affinity and fastness to light and strength.

The following examples illustrate the invention but are not intended to limit it in any way, the parts being by weight:

*Example 1*

13 parts of 1:9.5:10-anthradithiazole-2:6-dicarboxylic acid chloride of the formula

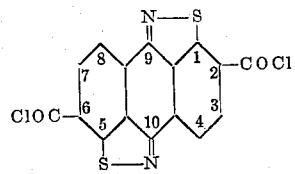

and 800 parts of dry ortho-dichlorobenzene are heated to 150–160° C. while stirring and mixed at this temperature with a hot solution of 23 parts of 1-amino-5-benzoylaminoanthraquinone in 400 parts of ortho-dichlorobenzene. The formation of dyestuff is complete after 2 hours' stirring at the boil. The crystallized dyestuff is suction-filtered in the heat, washed with ortho-dichlorobenzene and alcohol and dried. The dyestuff which is obtained in very good yield is a yellow powder dissolving in concentrated sulfuric acid to a red solution and dyeing cotton from a yellow-olive vat strong reddish yellow tints having very good fastness properties.

When substituting 1-amino-4-benzoylaminoanthraquinone for the 1-amino-5-benzoylaminoanthraquinone there is obtained a red powder by the same method of working which dissolves in concentrated sulfuric acid to a red solution and dyes cotton from a yellow-olive vat red-orange tints having good fastness properties.

The 1:9,5:10-anthradithiazole-2:6-dicarboxylic acid chloride used in this example has been prepared as follows:

18.25 parts of 1:5-dichloroanthraquinone-2:6-dicarboxylic acid, 16.5 parts of sulfur, 110 parts of crystallized sodium sulfide and 290 parts of ammonia of 12 per cent strength are heated in an autoclave provided with a stirrer for 8 hours to 95–105° C. When cold the content of the autoclave is suction-filtered, the filter residue is dissolved in 600 parts of boiling water, the solution is filtered and the disodium salt of the 1:9,5:10-anthradithiazole-2:6-dicarboxylic acid is salted out from the filtrate with common salt. It is suction-filtered, washed with a saturated solution of common salt, the filter cake is boiled with water with addition of some animal charcoal, the solution is filtered and the 1:9,5:10-anthradithiazole-2:6-dicarboxylic acid is precipitated from the filtrate with hydrochloric acid. After filtering, washing and drying a yellow-green crystalline powder is obtained in good yield which does not melt below 450° C.

11.8 parts of 1:9,5:10-anthradithiazole-2:6-dicarboxylic acid are heated to boiling during 1 hour with 12 parts of thionylchloride and 530 parts of dry ortho-dichlorobenzene. After distilling 65 parts of the mixture—the unconsumed thionylchloride being thereby removed—it is suction-filtered while hot and the filtrate is allowed to cool. The 1:9,5:10-anthradithiazole-2:6-dicarboxylic acid chloride crystallizes in greenish-yellow laminae melting at 323-325° C. after filtering, washing and drying.

Example 2

13 parts of 1:9,5:10-anthradithiazole-2:6-dicarboxylic acid chloride and 800 parts of dry ortho-dichlorobenzene are heated to 150-160° C. while stirring and mixed at this temperature with a hot solution of 14.9 parts of α-amino-anthraquinone in 400 parts of ortho-dichlorobenzene and 10 parts of pyridine. The formation of dyestuff is complete after stirring for 2 hours at the boil. The precipitated dyestuff is suction-filtered in the heat, washed with ortho-dichlorobenzene and alcohol and dried. The dyestuff so obtained is a yellow powder dissolving in concentrated sulfuric acid with a red solution and dyeing cotton from a yellow-olive vat strong yellow tints.

When using the equivalent quantity of 1-amino-6-chloranthraquinone or 1-amino-5-methoxy-anthraquinone instead of α-aminoanthraquinone, there are obtained dyestuffs which dye cotton from a yellow-olive vat also yellow tints.

When substituting β-aminoanthraquinone for the α-aminoanthraquinone there is obtained a greenish yellow powder which dissolves in concentrated sulfuric acid to a red solution and dyes cotton from an orange-brown vat strong greenish yellow tints.

Example 3

13 parts of 1:9,5:10-anthradithiazole-2:6-dicarboxylic acid chloride and 700 parts of dry nitrobenzene are heated while stirring to 150-160° C. and mixed at this temperature with a hot solution of 22.7 grams of 4-aminoanthraquinone-1(N):2-benzacridone in 700 parts of nitrobenzene and 10 parts of pyridine. The precipitated dyestuff is suction-filtered after two hours' stirring at boiling temperature, washed with nitrobenzene and alcohol and dried. It is a dark olive powder of the formula

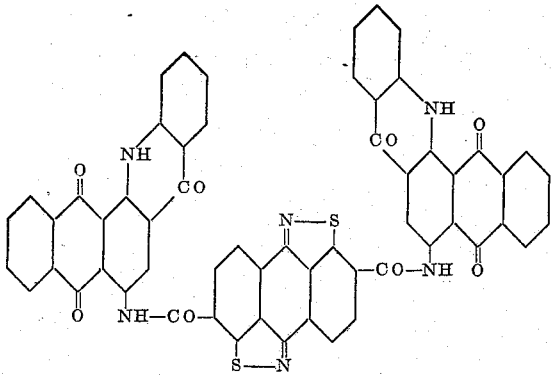

dissolving in concentrated sulfuric acid to a red solution and dyeing cotton from an olive-brown vat olive shades.

When using instead of 4-aminoanthraquinone-1(N)-2-benzacridone 4-amino-1:9-anthrapyrimidine there is obtained a yellow-brown powder which dyes cotton from a yellow-olive vat yellow shades.

Example 4

19.5 parts of 1:9,5:10-anthradithiazole-2:6-dicarboxylic acid chloride are heated to 150-160° C. with 1300 parts of dry trichlorobenzene, while stirring, and mixed at this temperature with a hot solution of 25.5 parts of 1-mercapto-2-aminoanthraquinone in 650 parts of trichlorobenzene. The splitting off of hydrochloric acid and water is complete after stirring for 2 hours. The precipitated dyestuff is suction-filtered in the heat, washed with trichlorobenzene and alcohol and dried. A brown powder is thus obtained which dissolves in concentrated sulfuric acid to a red solution and dyes cotton from a yellow-olive vat orange-brown shades.

The dyestuffs can be purified as follows:

2.5 parts of dyestuff powder are dissolved in 50 parts of concentrated sulfuric acid. This solution is poured onto ice, the precipitated dyestuff is suction-filtered, washed with water and suspended in 200 parts of water. 40 parts of sodium hypochlorite solution of 14 per cent. strength are added and stirring is continued for ½ hour at boiling temperature. The dyestuff thus becomes orange-red. It is suction-filtered, washed and dried. It dyes cotton orange-brown shades of greater purity than the crude product.

The dyestuff has probably the following constitution:

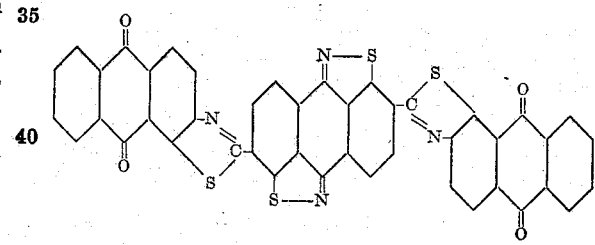

Example 5

13 parts of 4:10;8:9-anthradithiazole-1:5-dicarboxylic acid chloride of the formula

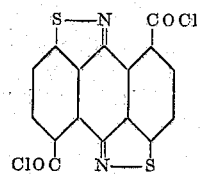

and 800 parts of dry ortho-dichlorobenzene are heated to 150-160° C. while stirring and mixed at this temperature with a hot solution of 23 parts of 1-amino-5-benzoylaminoanthraquinone in 400 parts of ortho-dichlorobenzene. The formation of dyestuff is complete after stirring for 2 hours at 150-160° C. The dyestuff is suction-filtered in the heat, the residue is washed with ortho-dichlorobenzene and alcohol and dried. The dyestuff which is obtained in very good yield is a yellow powder dissolving in concentrated sulfuric acid to a red solution and dyeing cotton from a red-brown vat yellow shades.

When substituting 1-amino-4-benzoylaminoanthraquinone for the 1-amino-5-benzoylaminoanthraquinone there is obtained a red powder dissolving in concentrated sulfuric acid to a red solution and dyeing cotton from a violet-brown vat red-orange shades.

When using the equivalent quantity of 1- or 2-amino-anthraquinone instead of 1-amino-5-benzoylamino-anthraquinone there are obtained dyestuffs dyeing cotton more greenish shades.

The 4:10,8:9-anthradithiazole-1:5-dicarboxylic acid chloride used in this example has been prepared in analogous manner like the above described 1:9,5:10-anthradithiazole-2:6-dicarboxylic acid chloride from 4:8-dichloroanthraquinone-1:5-dicarboxylic acid. From dichlorobenzene it is obtained in fluorescent greenish yellow needles. The 4:10,8:9-anthradithiazole-1:5-dicarboxylic acid formed as intermediate product is a yellow-green powder melting at 370° C. with decomposition.

*Example 6*

13 parts of di-(N)-methyl-1:9;5:10-anthradipyrazole-2:6-dicarboxylic acid chloride of the formula

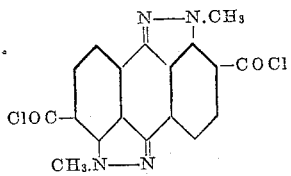

are caused to react at about 150° C. with 15 parts of 1-aminoanthraquinone in ortho-dichlorobenzene, as described in Example 5. The dyestuff thus obtained is a yellow-brown powder dissolving in concentrated sulfuric acid to a red solution and dyeing cotton from an orange-brown vat yellowish orange shades.

When substituting 2-aminoanthraquinone for the 1-aminoanthraquinone there is obtained a yellow powder dissolving in sulfuric acid to a yellow-red solution and dyeing cotton from an orange-brown vat strong yellow shades.

The di-(N)-methyl-1:9,5:10-anthradipyrazole-2:6-dicarboxylic acid chloride used in this example has been prepared as follows:

11 parts of 1:5-dichloroanthraquinone-2:6-dicarboxylic acid, 60 parts of pyridine and 6.6 parts of methylhydrazine of 80 per cent. strength are heated in an autoclave provided with a stirrer for 15 hours to 120–125° C. After cooling the content of the autoclave is suction-filtered and washed with pyridine. The filter residue is boiled up with dilute caustic soda solution and animal charcoal, the solution is filtered and the di-(N)-methyl-1:9,5:10-anthradipyrazole-2:6-dicarboxylic acid formed is precipitated with hydrochloric acid. When filtered, washed and dried it represents a yellow-orange powder dissolving in sulfuric acid to a green-yellow solution and melting above 320° C. with decomposition.

For the purpose of converting the compound into the acid chloride 7 parts of the acid are heated to boiling for ½ hour with 4 parts of thionyl chloride and 400 parts of dry ortho-dichlorobenzene, while stirring. After distilling 40 parts of the mixture the solution is suction-filtered while hot and the filtrate is allowed to cool. The di-(N)-methyl-1:9,5:10-anthradipyrazole-2:6-dicarboxylic acid chloride is crystallized in yellow-orange needles which, after filtering, washing and drying melt above 300° C. with decomposition.

*Example 7*

13 parts of di-(N)-methyl-1:9,5:10-anthradipyrazole-2:6-dicarboxylic acid chloride are caused to react with 23 parts of 1-amino-4-benzoylaminoanthraquinone, as described in Example 5. The dyestuff obtained is a brown powder dissolving in concentrated sulfuric acid to a red solution and dyeing cotton from an olive-brown vat yellow-brown shades.

When substituting 1-amino-5-benzoylaminoanthraquinone for the 1-amino-4-benzoylaminoanthraquinone there is obtained a brown powder dissolving in sulfuric acid to a red-brown solution and dyeing cotton from an olive-brown vat brownish yellow shades.

*Example 8*

1 part of the dyestuff obtained according to Example 1 (cf. paragraph 1) is suspended in 100 parts of water with addition of 4 parts by volume of caustic soda solution of 36° Bé. and the suspension is vatted with 2 parts of sodium hydrosulfite at about 50° C. This stock vat is added to a dye-bath which contains 8 parts by volume of caustic soda solution of 36° Bé. as well as 1 part of sodium hydrosulfite in 2000 parts of water. 100 parts of cotton are entered at 40° C., 30 parts of common salt are added after 15 minutes and dyeing is continued at 40–45° C. for further 45 minutes. The cotton is squeezed out, oxidized on the air, rinsed, acidified in usual manner, rinsed again and soaped at the boil. The cotton is dyed fast reddish yellow shades.

What we claim is:

1. A vat dyestuff of the formula

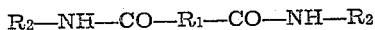

wherein $R_1$ stands for the radical of a compound selected from the group consisting of 1:9,5:10-anthradithiazole and 1:9,5:10-anthradipyrazole, the respective —CO— groups being severally attached to the two terminal benzene rings of the radical $R_1$, and each $R_2$ stands for the same radical of a vattable compound of the anthraquinone series.

2. A vat dyestuff of the formula

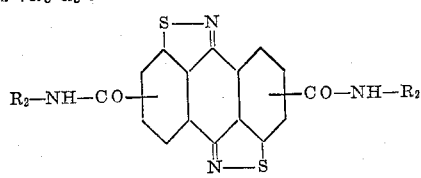

wherein each $R_2$ stands for the same radical of a vattable compound of the anthraquinone series.

3. A vat dyestuff of the formula

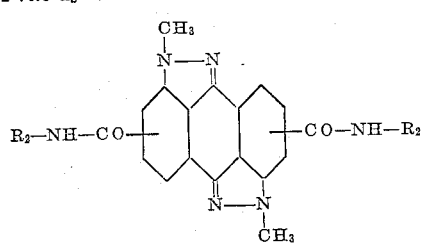

wherein each $R_2$ stands for the same radical of a vattable compound of the anthraquinone series.

4. A vat dystuff of the formula

wherein $R_1$ stands for the radical of a compound selected from the group consisting of 1:9,5:10-anthradithiazole and 1:9,5:10-anthradipyrazole, the respective —CO— groups being severally attached to the two terminal benzene rings of the radical $R_1$, and each $R_2$ stands for the same anthraquinone radical.

5. The compound of the formula

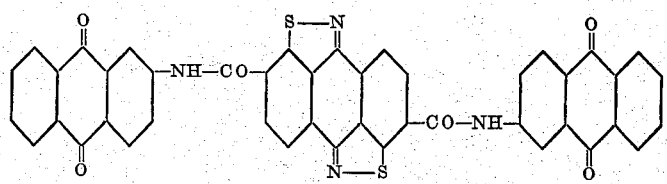

6. The compound of the formula

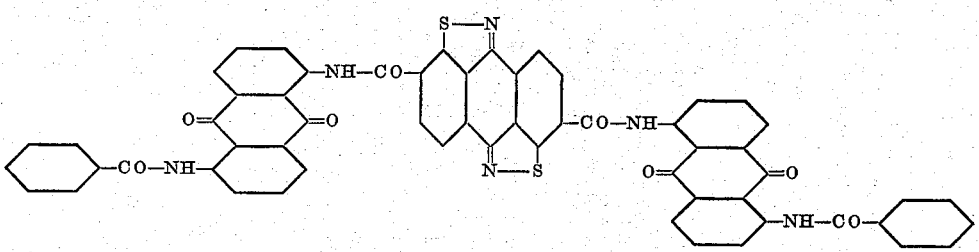

7. The compound of the formula

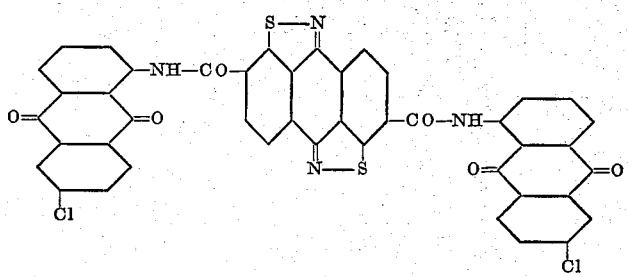

8. A process for the manufacture of vat dyestuff, which comprises reacting a dicarboxylic acid halide selected from the group consisting of 1:9,5:10-anthradithiazole dicarboxylic acid halides and 1:9,5:10-anthradipyrazole dicarboxylic acid halides containing the respective acid halide groups severally attached to the two terminal benzene rings, with two molecular proportions of an amino substitution product of a vattable compound of the anthraquinone series.

9. A process for the manufacture of a vat dyestuff, which comprises reacting a dicarboxylic acid halide selected from the group consisting of 1:9,5:10-anthradithiazole dicarboxylic acid halides and 1:9,5:10-anthradipyrazole dicarboxylic acid halides containing the respective acid halide groups severally attached to the two terminal benzene rings, with two molecular proportions of an aminoanthraquinone.

10. A process for the manufacture of a vat dye-stuff, which comprises reacting an anthradithiazole dicarboxylic acid halide of the formula

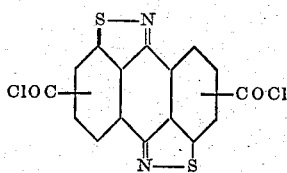

with two molecular proportions of an aminoanthraquinone.

11. A process for the manufacture of a vat dyestuff, which comprises reacting an anthradithiazole dicarboxylic acid halide of the formula

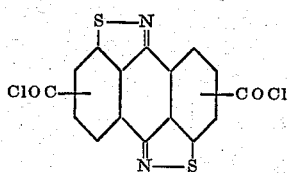

with two molecular proportions of 2-aminoanthraquinone.

12. A process for the manufacture of a vat dyestuff, which comprises reacting an anthradithiazole dicarboxylic acid halide of the formula

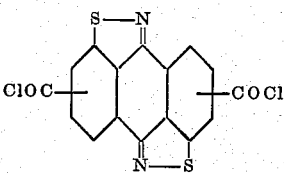

with two molecular proportions of 1-amino-5-benzoylaminoanthraquinone.

13. A process for the manufacture of a vat dyestuff, which comprises reacting an anthradithiazole dicarboxylic acid halide of the formula

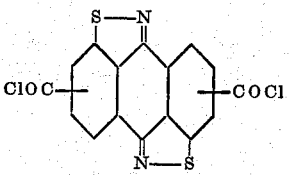

with two molecular proportions of 1-amino-6-chloro-anthraquinone.

THEODOR HOLBRO.
WALTER KERN.
PAUL SUTTER.